US012261400B2

(12) United States Patent
Miedl et al.

(10) Patent No.: US 12,261,400 B2
(45) Date of Patent: Mar. 25, 2025

(54) ELECTRICAL PLUG CONNECTOR AND ELECTRICAL PLUG CONNECTION

(71) Applicant: ROSENBERGER HOCHFREQUENZTECHNIK GMBH & CO. KG, Fridolfing (DE)

(72) Inventors: Thomas Miedl, Garching (DE); Martin Zebhauser, Laufen (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 18/705,406

(22) PCT Filed: Oct. 11, 2022

(86) PCT No.: PCT/EP2022/078197
§ 371 (c)(1),
(2) Date: Apr. 26, 2024

(87) PCT Pub. No.: WO2023/072579
PCT Pub. Date: May 4, 2023

(65) Prior Publication Data

US 2024/0429665 A1 Dec. 26, 2024

(30) Foreign Application Priority Data

Oct. 29, 2021 (EP) .................................... 21205495

(51) Int. Cl.
*H01R 24/40* (2011.01)
*H01R 13/631* (2006.01)
*H01R 103/00* (2006.01)

(52) U.S. Cl.
CPC ......... *H01R 24/40* (2013.01); *H01R 13/6315* (2013.01); *H01R 2103/00* (2013.01)

(58) Field of Classification Search
CPC .... H01R 24/40; H01R 24/50; H01R 2103/00; H01R 13/6315
(Continued)

(56) References Cited

U.S. PATENT DOCUMENTS 4,929,188 A * 5/1990 Lionetto ................ H01R 13/17 439/607.22
5,662,480 A * 9/1997 Togashi ................. H01R 24/50 439/582
(Continued)

OTHER PUBLICATIONS

European Search Report issued in App. No. EP21205495, dated Apr. 13, 2022, 8 pages.
(Continued)

*Primary Examiner* — Gary F Paumen
(74) *Attorney, Agent, or Firm* — Koffsky Schwalb LLC

(57) ABSTRACT

An insulation element and an outer conductor, at the end region of which spring lugs for contacting an outer conductor of the mating plug connector are formed. An electrical plug connector for electrically and mechanically connecting to an electrical mating plug connector has an insulation element and an outer conductor contact element, which at least partly surrounds the insulation element. Spring lugs for contacting a corresponding outer conductor of the mating plug connector are formed in the outer conductor contact element. When the plug connector is not plugged together with the mating plug connector, at least one spring lug is spaced apart from the insulation element. When the plug connector is partly plugged together or plugged together with the mating plug connector, the insulation element is centeredly clamped by at least a subset of the spring lugs because of a first element of the mating plug connector, said first element being applied to the outer conductor contact element.

12 Claims, 5 Drawing Sheets

Figure 1A:
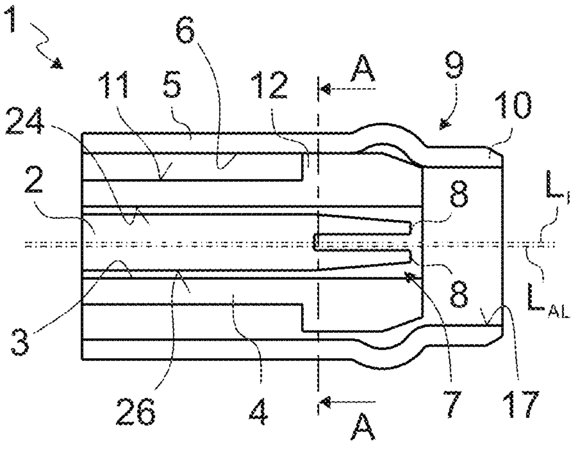

(58) Field of Classification Search
USPC .......................................... 439/248, 63, 578
See application file for complete search history.

(56) References Cited

U.S. PATENT DOCUMENTS

| | | | | |
|---|---|---|---|---|
| 8,690,583 | B2 * | 4/2014 | Uesaka ................ | H01R 12/714<br>439/63 |
| 9,831,584 | B2 | 11/2017 | Singhammer | |
| 2003/0203658 | A1 * | 10/2003 | Zhao ...................... | H01R 24/50<br>439/63 |
| 2016/0141784 | A1 * | 5/2016 | Hashiguchi ............ | H01R 24/50<br>439/733.1 |

OTHER PUBLICATIONS

International Search Report and Written Opinion issued in App. No. PCT/EP2022/078197, mailing date Feb. 6, 2023, 11 pages.

* cited by examiner

ELECTRICAL PLUG CONNECTOR AND ELECTRICAL PLUG CONNECTION

The present application lays claim to the priority of European patent application No. 21 205 495.1, the content of which is incorporated herein in its entirety by reference.

FIELD OF THE INVENTION

The present invention relates to an electrical plug connector that exhibits an insulator element and an outer-conductor contact element on which spring lugs have been formed for electrical contacting of a corresponding outer conductor of the mating plug connector.

The present invention relates, in addition, to an electrical plug connection with an electrical plug connector of such a type and an associated electrical mating plug connector.

TECHNICAL BACKGROUND

A correct mode of operation of an electrical plug connection requires, above all, correct electrical contacting between the electrical plug connector and the associated electrical mating plug connector. In the case of a coaxial electrical plug connection, for this purpose the outer-conductor and inner-conductor contact elements of the electrical plug connector and also of the electrical mating plug connector must each have been arranged sufficiently centrically relative to one another. Also in the case of an electrical plug connection for transmitting a differential signal, the outer-conductor contact element should be arranged in centered manner relative to the two inner-conductor contact elements. For this purpose, the point of intersection of the two axes of the outer-conductor contact element should be arranged at the midpoint of the spacing of the two inner-conductor contact elements, which constitutes the center of the differential plug connector.

If sufficient centricity does not obtain between the outer-conductor contact and the inner-conductor contact, or the pair of inner-conductor contact elements, in extreme cases a plug-in procedure involving the electrical plug connector and the electrical mating plug connector is not possible. The lack of centricity may also result in a distortion of the contact elements, and consequently in a faulty or absent contact on the outer-conductor side and/or inner-conductor side.

The lack of centricity between the outer-conductor contact element and the inner-conductor contact element, or the pair of inner-conductor contact elements, results from an axial offset between the outer-conductor contact element and the inner-conductor contact element, or the pair of inner-conductor contact elements, from an angular offset of the insulator element in the outer-conductor contact element, and/or from an angular offset of the inner-conductor contact element, or of the pair of inner-conductor contact elements, in the insulator element.

The stated axial and angular offsets originate, in turn, from inaccuracies of manufacture of the individual components constituted by outer-conductor contact element, insulator element and inner-conductor contact element, as well as inaccuracies or errors in the assembly process.

Whereas a one-hundred-percent correct mode of operation of the electrical plug connection is demanded, such inaccuracies or errors in manufacture or assembly cannot be ruled out one-hundred percent.

This is a state of affairs that needs to be improved.

With regard to the general technological background, let reference be made to U.S. Pat. No. 9,831,584 B2 which relates to a plug connector with an inner conductor and with an insulator surrounding the inner conductor, wherein the insulator exhibits a first insulator part and a second insulator part, which are connected to one another in relatively rotatable manner by means of an insulator joint.

SUMMARY OF THE INVENTION

Against this background, the object underlying the present invention is to realize a centering between the outer-conductor and inner-conductor contact elements of an electrical plug connection, preferably of a coaxial electrical plug connection, also in the case where the individual components of the electrical plug connection are subject to, for instance, the aforementioned inaccuracies or errors in their manufacture or in their assembly.

In accordance with the invention, this object is achieved by an electrical plug connector with the features as disclosed herein.

Accordingly, there is provided:

An electrical plug connector for electrical and mechanical connection to an electrical mating plug connector, exhibiting:

- an insulator element and
- an outer-conductor contact element which at least partly surrounds the insulator element,
- wherein spring lugs for electrical contacting of a corresponding outer conductor of the mating plug connector (in particular, of a corresponding outer-conductor contact element of the mating plug connector) have been formed in the outer-conductor contact element,
- wherein in a non-plugged state of the plug connector with the mating plug connector at least one spring lug is spaced from the insulator element (that is to say, the insulator element may display freedom of movement relative to the outer-conductor contact element),
- wherein the insulator element and at least a subset of the spring lugs have been set up (in particular, have each been formed and/or arranged relative to one another) such that in a partly plugged state or in a plugged state of the plug connector with the mating plug connector (that is to say, during and/or after a procedure for plugging the plug connector together with the mating plug connector) the insulator element has been clamped in centered manner directly or at least indirectly by at least a subset of the spring lugs by virtue of a first element, applied (preferentially directly, but where appropriate also only indirectly) onto the outer-conductor contact element, of the mating plug connector.

Any number of spring lugs may have been provided. For instance, two or more spring lugs may have been provided, but preferentially (but not necessarily) three or more spring lugs have been provided. Particularly if fewer than three spring lugs have been provided, the spring lugs may optionally each exhibit several mechanical contact points—for instance, convex elevations.

At least a subset of the spring lugs may undergo a lateral deflection as a result of a procedure for plugging together the plug connector and the mating plug connector, so that the at least one subset of the spring lugs has been positioned closer to a longitudinal axis of the outer-conductor contact element and contacts the insulator element directly or indirectly with a contact pressure in such a manner in order to move the insulator element from a position that is not centered relative to the longitudinal axis into a position that is centered relative to the longitudinal axis.

Optionally, but not necessarily, a latching mechanism may have been provided between the plug connector and the mating plug connector, in order to lock the plug connection in its closed state.

The insight/idea underlying the present invention consists in converting the greatest possible cause of a lack of centricity between the outer-conductor contact element and the inner-conductor contact element in the non-plugged state of the plug connector—namely the lack of centricity between the outer-conductor contact element and the insulator element of the plug connector—as a result of the plug-in procedure into a centricity between the outer-conductor contact element and the insulator element of the plug connector in the plugged state of the plug connection.

The outer-conductor contact element of the plug connector constitutes the reference element for the centering of the remaining components of the plug connector, since, on the one hand, the contacting between the plug connector and the mating plug connector during the plug-in procedure preferentially occurs, at first, on the outer-conductor side, and consequently the outer-conductor contact element of the plug connector has, at first, been fixed to the corresponding outer conductor of the mating plug connector. On the other hand, the outer-conductor contact element has preferentially been mechanically fixed in the plug-connector housing of the plug connector, or formed in one piece with the plug-connector housing.

The outer-conductor contact element preferentially displays no freedom of movement in relation to the plug-connector housing, which may be particularly advantageous if the mechanical connection between the plug connector and the mating plug connector occurs via the associated plug-connector housings. But the remaining individual components of the plug connector preferentially display freedom of movement within certain limits in relation to the outer-conductor contact element, which is utilized for the purpose of centering during the plug-in procedure.

For electrical contacting of the plug connector with the associated mating plug connector, several spring lugs have been formed in the outer-conductor contact element. These spring lugs are able to contact a preferentially sleeve-shaped corresponding outer conductor of the mating plug connector, which in the plugged state has preferentially been arranged laterally outside the outer-conductor contact element of the plug connector. Alternatively, in the plugged state the outer conductor of the mating plug connector may also have been arranged laterally within the outer-conductor contact element of the plug connector.

In the non-plugged state of the plug connector, by reason of the eccentricity the longitudinal axis of the outer-conductor contact element cannot have an identical position or an identical orientation relative to the longitudinal axis of the insulator element. Of the spring lugs of the outer-conductor contact element that, by reason of the lack of electrical contacting with the outer conductor of the mating plug connector, do not undergo a lateral deflection, either all the spring lugs or only a subset of the spring lugs are spaced from the respectively opposing external generated surface of the insulator element.

The "longitudinal axis of a body"—that is to say, for instance, of an outer-conductor contact element, of an insulator element, or of an inner-conductor contact element, each with a round cross-sectional profile—in this connection and in the following is to be understood to mean the axis of the body extending in the axial direction and in the radial center. In the case of a body with an elliptical cross-sectional profile, the "longitudinal axis" is to be understood to mean the axis of a body extending in the axial direction and at the point of intersection of the major and minor axes of the ellipse. Bodies having a different cross-sectional profile—for instance, having a square or polygonal cross-sectional profile—are also conceivable. The "longitudinal axis" of such a body is to be understood to mean the axis of the body extending in the axial direction and at the center of gravity of the cross-sectional profile.

In the case of a coaxial plug connector, "centering" is understood to mean the alignment of the outer-conductor contact element, of the insulator element, and of the inner-conductor contact element with the common longitudinal axis. In the case of a differential plug connector, "centering" is understood to mean the alignment of the longitudinal axis in the center of the spacing of the two inner-conductor contact elements with the longitudinal axis at the center of gravity of the cross-sectional profile—that is to say, at the point of intersection of the two axes, of the insulator element, and of the outer-conductor contact element.

During the plug-in procedure, the spring lugs of the outer-conductor contact element preferentially undergo a deflection directed laterally inward by virtue of the outer conductor of the mating plug connector, preferentially in such a way that the deflected spring lugs have been positioned closer to the longitudinal axis of the outer-conductor contact element than in the non-plugged state of the plug connection.

At least a subset of the spring lugs preferentially undergoes an equally large lateral deflection as a result of the plug-in procedure, so that in the plugged state of the plug connection or during the plug-in procedure of the plug connection the subset of the spring lugs has been positioned closer to the longitudinal axis of the outer-conductor contact element than in the non-plugged state of the plug connection. By virtue of the change of position, at least the subset of the spring lugs contacts the insulator element with a certain contact pressure and consequently clamps the insulator element centrically. By virtue of the clamping by at least a subset of the spring lugs, the insulator element is consequently moved from a position that is not centered relative to the outer-conductor contact element into a position that is centered relative to the outer-conductor contact element.

In this connection and in the following, "clamped in centered manner" in the case of a coaxial plug connector is to be understood to mean that as a result of the clamping of the insulator element by means of at least a subset of the spring lugs a longitudinal axis of the insulator element comes to be situated on a longitudinal axis of the outer-conductor contact element. In this connection and in the following, "clamped in centered manner" in the case of a differential plug connector is to be understood to mean that as a result of the clamping of the insulator element by means of at least a subset of the spring lugs a longitudinal axis through the lateral center of gravity of the insulator element comes to be situated on a longitudinal axis through the lateral center of gravity of the outer-conductor contact element.

Depending on the shaping of the spring lugs and/or of the insulator element, the clamping of the insulator element may have been realized by at least a subset of the spring lugs in the plugged state of the plug connection—that is to say, in the fully plugged state of the plug connection. Alternatively, the clamping may have been realized only during the plug-in procedure—that is to say, in the partly plugged state of the plug connection—whereas in the fully plugged state of the plug connection the clamping no longer obtains. A clamping during the plug-in procedure that is still maintained also subsequently—that is to say, in the fully plugged state of the plug connection—may even have been provided.

Preferentially, all the spring lugs of the outer-conductor contact element clamp the insulator element in the plugged state of the plug connection or during the plug-in procedure of the plug connection—that is to say, only in the partly plugged state of the plug connection. For this purpose, all the spring lugs have preferentially been shaped identically. Alternatively, only a subset of the spring lugs may clamp the insulator element in the plugged state of the plug connection or during the plug-in procedure of the plug connection—that is to say, only in the partly plugged state of the plug connection. In order to implement a centering of the insulator element relative to the outer-conductor contact element in this alternative, preferentially at least three spring lugs may have been provided for the purpose of clamping, which have preferentially been formed in equidistant angular sections within the outer-conductor contact element. The at least three spring lugs have each been shaped in such a manner that only the at least three spring lugs clamp the insulator element, whereas the remaining spring lugs have been shaped differently, so that the remaining spring lugs do not clamp the insulator element.

In a development of the invention, during the plug-in procedure of the plug connection, or, to be more precise, in the partly plugged state, or in the plugged state of the plug connection at least a subset of the spring lugs may have been positioned in each instance closer to the longitudinal axis of the outer-conductor contact element than in the non-plugged state of the plug connection and may in each instance contact with a certain contact pressure a second element inserted between the outer-conductor contact element and the insulator element.

The aforementioned "second element" may preferentially be an insulator of the mating plug connector. The insulator of the mating plug connector may consequently have been deflected into a position that is centered relative to the longitudinal axis of the outer-conductor contact element of the plug connector. The insulator of the mating plug connector, centered relative to the longitudinal axis of the outer-conductor contact element of the plug connector, can in this case deflect the insulator element of the plug connector from a position that is not centered relative to the longitudinal axis of the outer-conductor contact element into a centered position.

At least a subset of the spring lugs can consequently undergo a lateral deflection as a result of a procedure for plugging together the plug connector and the mating plug connector, so that the at least one subset of the spring lugs has been positioned closer to a longitudinal axis of the outer-conductor contact element and has been set up to move the insulator of the mating plug connector into a position that is centered relative to the longitudinal axis. The insulator of the mating plug connector, centered relative to the longitudinal axis, can consequently move the insulator element of the plug connector from a position that is not centered relative to the longitudinal axis into a position that is centered relative to the longitudinal axis.

Consequently, in the plugged state of the plug connection or during the plug-in procedure of the plug connection the insulator element has in each instance been clamped directly by at least a subset of the spring lugs of the outer-conductor contact element or has been centrically clamped indirectly via the second element (preferentially the insulator of the mating plug connector) inserted in between.

During the plug-in procedure, the insulator element of the plug connector undergoes a movement from an eccentric position to a centric position with respect to the outer-conductor contact element. The centering of the insulator element with respect to the outer-conductor contact element consequently occurs by virtue of the fact that the insulator element has been clamped concentrically into the outer-conductor contact element by the spring lugs, acting in each instance as clamping means, of the outer-conductor contact element.

In the plugged state of the plug connection, in the case of a centering between the outer-conductor contact element and the insulator element at least a subset of the spring lugs touches the external generated surface of the insulator element without an air gap located in between. In the case of a second element (that is to say, for example, the insulator) of the mating plug connector inserted between the spring lugs and the insulator element of the plug connector, at least a subset of the spring lugs touches the external generated surface of the second element or insulator without an air gap located in between. The internal generated surface of the second element, or insulator, of the mating plug connector and the external generated surface of the insulator element of the plug connector have in this case preferentially been arranged without the presence of play relative to one another.

By "direct clamping" of the insulator element by at least a subset of the spring lugs, or by "indirect clamping" of the insulator element via a second element (for example, the insulator of the mating plug connector) inserted in between by at least a subset of the spring lugs, in this connection a spring-loaded centering of the insulator element onto the longitudinal axis of the outer-conductor contact element is to be understood. At least a subset of the spring lugs exerts in each instance a laterally directed spring force on the insulator element in the course of the plug-in procedure of the plug connection, which results in a deflection of the insulator element from an eccentric position into a centric position.

The eccentric position of the insulator element in a non-plugged state of the plug connector with the mating plug connector is characterized in that at least one spring lug is spaced from the insulator element. The centric position of the insulator element during the plug-in procedure of the plug connection or in the plugged state of the plug connector is characterized in that either the insulator element has been directly clamped centrically between at least a subset of the spring lugs or at least a subset of the spring lugs clamps centrically in each instance a second element (for example, the insulator of the mating plug connector) inserted between the outer-conductor contact element and the insulator element of the plug connector.

The second element, or the insulator, of the mating plug connector is preferentially a sleeve-shaped element or an element formed in the manner of a sleeve in the distal end region. This sleeve-shaped element is preferably the insulator, or the insulator element, of the mating plug connector, preferentially an end region, shaped in the manner of a sleeve, of the insulator of the mating plug connector.

The longitudinal extents of the spring lugs or of the spring arms of the spring lugs have, as usual, been oriented in the longitudinal axial direction of the outer-conductor contact element and have been formed in equidistant angular sections around the periphery of the end region of the outer-conductor contact element in the shape of a spring sleeve or spring basket. The spring lugs may have been designed to be capable of being deflected laterally inward. The spring lugs may each have been fastened to the outer-conductor contact element, on one side by one spring-lug end in each instance, or on two sides by two spring-lug ends in each instance. The spring lugs have preferentially been formed in an end region of the outer-conductor contact element on the plugging side.

Advantageous configurations and developments arise out of the description with reference to the figures of the drawing.

It will be understood that the features stated above and those yet to be elucidated below are capable of being used not only in the combination specified in the given case but also in other combinations or on their own, without departing from the scope of the present invention.

In a particularly preferred development of the invention, at least a subset of the spring lugs has been set up to be capable of being contacted by an outer conductor of the mating plug connector with a contact pressure directed laterally inward, and to be capable of being moved laterally inward.

In a likewise preferred development of the invention, the first element of the mating plug connector is the corresponding outer conductor of the mating plug connector, which is capable of being applied, at least in sections, onto the outer-conductor contact element of the plug connector, in order to subject at least the subset of the spring lugs to a force directed laterally inward (preferentially in order to deflect the spring lugs laterally inward).

In a preferential design of the invention, during the plug-in procedure of the plug connection, or, to be more precise, in the partly plugged state, or in the plugged state of the plug connection, in each instance a mechanical contact region formed on an internal surface of each spring lug contacts respectively an associated mechanical contact region formed on an external generated surface of the insulator element. As distinct from an electrical contact region of a contact element, which electrically contacts a mating contact region of a mating contact element, a mechanical contact region is to be understood to be a region of a body that mechanically touches a mating-contact region of a further body. In this connection, in the case of a coaxial plug connector each mechanical contact region on the external generated surface of the insulator element has been formed in each instance in such a manner that each mechanical contact region on the external generated surface of the insulator element has the same radial spacing from the longitudinal axis of the insulator element. In addition, in this case the mechanical contact region on the internal surface of each mechanically contacting spring lug has been formed in each instance in such a manner that the mechanical contact region on the internal surface of each mechanically contacting spring lug has in each instance the same radial spacing from the longitudinal axis of the outer-conductor contact element.

In another preferential design of the invention, in the partly plugged state or in the plugged state of the plug connection a mechanical contact region, formed in each instance on an internal surface of at least a subset of the spring lugs, contacts respectively an external generated surface of the second element of the mating plug connector (that is to say, for example, of the insulator), the second element, or the insulator, preferentially having been designed to be sleeve-shaped. Preferentially in this case, the internal generated surface of the second element, or insulator, has been arranged without play relative to the external generated surface of the insulator element of the plug connector. In this connection, in the case of a coaxial plug connector each mechanical contact region has been formed on the external generated surface of the preferentially sleeve-shaped element, or insulator, in each instance in such a manner that each mechanical contact region on the external generated surface of the preferentially sleeve-shaped element, or insulator, has the same radial spacing from the longitudinal axis of the insulator element. The mechanical contact region on the internal surface of at least a subset of the spring lugs may in each instance have been formed in such a manner that the mechanical contact region on the internal surface of at least a subset of the spring lugs has in each instance the same radial spacing from the longitudinal axis of the outer-conductor contact element.

Consequently, within the scope of the invention it can be guaranteed that in the case of an equally long lateral deflection of at least a subset of the spring lugs by the outer conductor of the mating plug connector and in the case of otherwise identical geometrical and material design of at least a subset of the spring lugs the insulator element has been centered relative to the outer-conductor contact element.

In a first manifestation of the invention, the mechanical contact regions on the external generated surface of the insulator element have been formed on a lateral extension of the insulator element that has been laterally raised in comparison with the lateral dimension of the insulator element in the remaining axial regions of the insulator element. In the first manifestation, the mechanical contact regions on the spring lugs have been formed on an inside or internal surface of the spring lugs that has not been laterally extended.

The lateral extension of the insulator element may be, for instance, a radial, elliptical or polygonal extension in the case of a radial, elliptical or polygonal basic cross-section of the insulator element. The lateral extension of the insulator element extends at least along an axial portion of a longitudinal extent of the spring lugs—that is to say, it may extend only along a portion of the longitudinal extent of the spring lugs or along the entire longitudinal extent of the spring lugs. But it may also extend beyond the longitudinal extent of the spring lugs—that is to say, it may have a longer longitudinal extent than the longitudinal extent of the spring lugs.

In another preferential design of the first manifestation of the invention, the lateral extension of the insulator element, on which the individual mechanical contact regions have been formed, has been shaped in rotationally symmetrical manner. The simplest and consequently most preferred rotationally symmetrical design of a lateral extension of the insulator element is a cylindrical shaping of the lateral extension, in which the individual mechanical contact regions have been positioned on an external generated surface having the same radius over the entire axial longitudinal extent and over the entire rotational angular extent of the cylindrical shape.

But it is also conceivable that the individual mechanical contact regions on the external generated surface of the insulator element have each been formed on an associated lateral extension in an angular segment that corresponds to the angular segment of the associated contacting spring lug. But such a shaping consisting of individual lateral extensions each distributed in each instance equidistantly on the periphery of the insulator element necessitates a phase-angle-congruent arrangement of the outer-conductor contact element with its individual spring lugs relative to the individual lateral extensions on the insulator element.

In a second manifestation of the invention, the individual mechanical contact regions on the external generated surface of the insulator element have been formed on a lateral extension that is bead-shaped or ring-shaped. The bead-shaped or ring-shaped design may in this case also have been shaped either in rotationally symmetrical manner or only in individual, equidistantly distributed angular segments. The bead-shaped or ring-shaped lateral extension preferentially exhibits in the axial direction a rounded longitudinal profile—that is to say, a semicircular longitudinal profile—or a tapering longitudinal profile, so that the contact between the bead-shaped or ring-shaped lateral extension on the external generated surface of the insulator element and the individual spring lugs is linear or punctiform in each instance. A pointed design of the lateral extension in the axial direction and, at the same time, in the peripheral direction is also conceivable. Consequently the axial position of the clamping of the insulator element has been spatially delimited by the spring lugs of the outer-conductor contact element, and therefore the centering of the insulator element has additionally been specified more precisely.

In comparison with a cylindrical lateral extension, the bead-shaped or ring-shaped lateral extension on the external generated surface of the insulator element has, above all, a smaller axial dimension and can consequently be laterally compressed more easily by the laterally directed spring force of the individual spring lugs. The lateral compression gives rise to an axial expansion of the bead-shaped or ring-shaped lateral extension. The lateral compression of the bead-shaped or ring-shaped lateral extension of the insulator element by the spring lugs advantageously necessitates an additional mechanical fixing of the insulator element to the outer-conductor contact element in the lateral direction in comparison with a pure contacting of the bead-shaped or ring-shaped lateral extension by the spring lugs.

In this context, attention is drawn to the fact that in the second manifestation of the invention a rotationally symmetrical lateral extension formed on the external generated surface of the insulator element has been formed in one piece with the remaining insulator element.

Alternatively, in a third manifestation of the invention the lateral extension may also have been produced as a separate element and may have been guided over the external generated surface of the insulator element and connected to the insulator element, axially adjacent to the spring lugs. The connection in this case preferentially occurs by force closure (for instance, press fit) or by material closure (for instance, gluing).

The separate element that forms the lateral extension and has been placed over the insulator element has preferentially been produced from a dielectric material. But a separate element made of a metallic material is also conceivable. In this special case there is a capacitive point of perturbation in the impedance curve of the plug connector, which is capable of being compensated by a corresponding inductively formed compensation in a different axial section of the plug connector.

In a fourth variant of the invention, a lateral extension on which the individual mechanical contact region of the spring lug is located has been formed in each instance on the internal surfaces of the individual spring lugs. In the fourth variant, the external generated surface of the insulator element may exhibit a lateral extension or may not exhibit a lateral extension. In the case of a coaxial plug connector, the inner radii of the lateral extensions of the individual spring lugs relative to the longitudinal axis of the outer-conductor contact element are of equal magnitude in each instance.

Since the lateral extensions on the internal surfaces of the individual spring lugs each represent a point of discontinuity in the impedance curve of the plug connector, which make the impedance curve in the axial extent of the lateral extension more capacitive, a corresponding inductive compensation of this capacitive impedance perturbation should be realized in a different axial region of the plug connector.

The lateral extension on the internal surface of at least a subset of the spring lugs has, by analogy to the lateral extension on the external generated surface of the insulator element, preferentially been designed in the form of a bead. With regard to a linear or punctiform contacting with the associated mechanical contact region on the external generated surface of the insulator element, the longitudinal-section profile of the bead-shaped lateral extension has preferentially been shaped in rounded or semicircular manner, or alternatively in tapering manner. A pointed design of the lateral extension in the axial direction and, at the same time, in the peripheral direction is also conceivable.

The mechanical contact regions on the external generated surface of the insulator element and the associated mechanical contact regions on the internal surface of at least a subset of the spring lugs should be formed in each instance in the same axial region of the plug connector, in order to bring about a mechanical contact between the outer-conductor contact element and the insulator element on a concentric line around the coincident longitudinal axes of the outer-conductor contact element and of the insulator element. A particularly good centering of the insulator element relative to the outer-conductor contact element has consequently been realized.

In a fifth manifestation of the invention, at least a subset of the spring lugs of the outer-conductor contact element has in each instance been set up to clamp a second element of the mating plug connector, inserted between the outer-conductor contact element and the insulator element, which is preferentially sleeve-shaped and arranged without play relative to the insulator element. This second element may preferably be the sleeve-shaped insulator of the mating plug connector, particularly preferably a sleeve-shaped end region of the insulator of the mating plug connector.

In the plugged state of the plug connection, in this case the sleeve-shaped insulator of the mating plug connector, preferably the sleeve-shaped end region of the insulator of the mating plug connector, has been inserted between at least a subset of the spring lugs of the outer-conductor contact element and the insulator element of the plug connector.

The outside diameter of the insulator element of the plug connector may in this case have been designed in such a manner that it corresponds to the inside diameter of the sleeve-shaped insulator of the mating plug connector, preferably to the sleeve-shaped end region of the insulator of the mating plug connector. Consequently, during the plug-in procedure the sleeve-shaped insulator, preferably the sleeve-shaped end region of the insulator of the mating plug connector, has been guided by the external generated surface of the insulator element of the plug connector. In addition, by this means it is guaranteed that in the plugged state of the plug connection the insulator, preferably the end region of the insulator of the mating plug connector, has been arranged without play relative to the insulator element of the plug connector. Together with the fact that at least a subset of the spring lugs of the outer-conductor contact element of the plug connector contacts the insulator of the mating plug connector with a certain spring force, this advantageously results in an indirect centering of the insulator element relative to the outer-conductor contact element of the plug connector.

In a further technical measure for centering the outer-conductor contact element and the inner-conductor contact element—the sixth manifestation of the invention—the inner-conductor contact element is centered relative to the insulator element. The lack of centricity of the inner-conductor contact element relative to the insulator element is typically less pronounced in comparison with the lack of centricity of the insulator element relative to the outer-conductor contact element by reason of the distinctly smaller lateral dimension of the inner-conductor contact element relative to the outer-conductor contact element and by reason of the distinctly smaller tolerances on the inner-conductor side in comparison with the tolerances on the outer-conductor side. This is the reason why the centering of the inner-conductor contact element relative to the insulator element is to be understood as being only supplemental to the centering, presented hitherto, of the insulator element relative to the outer-conductor contact element in the course of the centering of the outer-conductor contact element and of the inner-conductor contact element.

Since the outside diameter of the preferentially cylindrically shaped inner conductor is smaller than the inside diameter of the through-bore—that is to say, the longitudinal bore—of the insulator element which is preferentially shaped in the form of a hollow cylinder, a twisting of the longitudinal axis of the inner-conductor contact element in relation to the longitudinal axis of the insulator element, and therefore a lack of centricity, may occur.

For the purpose of centering, two lateral extensions have been formed on the internal generated surface of the insulator element, axially offset from one another. Mechanical contact regions, formed in each instance on the lateral extensions, contact an external generated surface of the inner-conductor contact element. The lateral dimensions of the two lateral extensions have each been designed to be of the same magnitude. The axial spacing of the two lateral extensions on the internal generated surface of the through-bore of the insulator element and the same lateral dimension of the two lateral extensions over the respective entire periphery prevent a tilting of the inner-conductor contact element in the through-bore of the insulator element, and bring about a centering.

In addition to a lateral extension, preferentially formed in rotationally symmetrical manner, individual lateral extensions each having the same lateral dimension are also conceivable which have been formed in each instance in individual equidistantly offset angular segments. The lateral dimensions of the two axially offset lateral extensions have each been designed in such a manner that they mechanically contact the inner-conductor contact element and consequently align the inner-conductor contact element centrically relative to the insulator element.

Preferentially, the two lateral extensions formed in axially offset manner on the internal generated surface of the through-bore of the insulator element have each been shaped in the form of a bead or in the form of a ring, in order to implement in each instance a linear contact between the inner-conductor contact element and the insulator element, and therefore a precise centering. Alternatively, the through-bore of the insulator element may have been formed in stepped manner. For this purpose, a lateral extension has been formed by the internal generated surface of the insulator element in the region of the through-bore having the smaller lateral dimension, and the further lateral extension has been formed by a ring-shaped or bead-shaped lateral extension on the internal generated surface of the insulator element in the region of the through-bore having the larger lateral dimension.

The two lateral extensions have each been formed in an axial section of the insulator element that is situated axially opposite the rigid section of the inner-conductor contact element and is consequently axially spaced from the distal end section of the inner-conductor contact element with its spring lugs.

Since the centering error on the inner-conductor side is, as already mentioned, smaller by a multiple in comparison with the centering error on the outer-conductor side, the lateral dimension of the lateral extensions on the internal generated surface of the insulator element is preferentially smaller in each instance by a multiple, preferentially by a factor of two to 15, particularly preferentially by a factor of four to 10, than the lateral dimensions of the lateral extension on the external generated surface of the insulator element.

As an alternative to the realization of two lateral extensions of the insulator element, formed in axially offset manner on the internal generated surface of the through-bore, two lateral extensions, formed in axially offset manner on the external generated surface of the inner-conductor contact element, are also conceivable for the purpose of centering the inner-conductor contact element relative to the insulator element. Since the two lateral extensions on the external generated surface of the inner-conductor contact element each represent capacitive points of perturbation in the impedance curve of the plug connector, these should be compensated, where appropriate, by corresponding inductively formed compensations within the longitudinal extent of the plug connector, to the extent required.

An electrical plug connection consisting of an electrical plug connector, the technical features of which have been described hitherto, and an associated electrical mating plug connector is also covered by the invention. The technical features and technical effects or technical advantages described hitherto and to be described in the following for the electrical plug connector also apply correspondingly to the electrical plug connection, and conversely.

The invention also relates to an electrical plug connector for electrical and mechanical connection to an electrical mating plug connector, exhibiting an inner-conductor contact element and an insulator element which at least partly surrounds the inner-conductor contact element, wherein a lateral dimension of the inner-conductor contact element is smaller than a lateral dimension of a through-bore of the insulator element, wherein two lateral extensions have been formed, axially offset from one another, on the internal generated surface of the through-bore, wherein mechanical contact regions, formed in each instance on the lateral extensions, contact an external generated surface of the inner-conductor contact element. The features described in the present description relate to advantageous embodiments and variants of this electrical plug connector.

The above configurations and developments can be combined arbitrarily with one another, to the extent that this is sensible. Further possible configurations, developments and implementations of the invention also encompass combinations, not mentioned explicitly, of features of the invention described previously or in the following with respect to the embodiment examples. In particular, a person skilled in the art will also add individual aspects as improvements or supplements to the respective basic form of the present invention.

The invention also relates to an electrical plug connector for electrical and mechanical connection to an electrical mating plug connector, exhibiting:

an insulator element and an outer-conductor contact element which at least partly surrounds the insulator element, wherein spring lugs for electrical contacting of a corresponding outer conductor of the mating plug connector have been formed in the outer-conductor contact element, wherein in a non-plugged state of the plug connector with the mating plug connector the insulator element displays freedom of movement relative to the outer-conductor contact element, and at least one spring lug is spaced from the insulator element, and wherein at least a subset of the spring lugs undergoes a lateral deflection as a result of a procedure for plugging together the plug connector and the mating plug connector, so that the at least one subset of the spring lugs has been positioned closer to a longitudinal axis of the outer-conductor contact element and contacts the insulator element directly or indirectly with a contact pressure in such a manner in order to move the insulator element from a position that is not centered relative to the longitudinal axis into a position that is centered relative to the longitudinal axis.

The features described in the present description relate to advantageous embodiments and variants of the electrical plug connector described in the preceding paragraph.

STATEMENT OF CONTENTS OF THE DRAWING

Figure 1B:
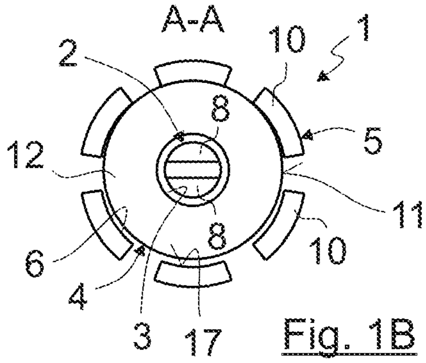
Figure 1C:
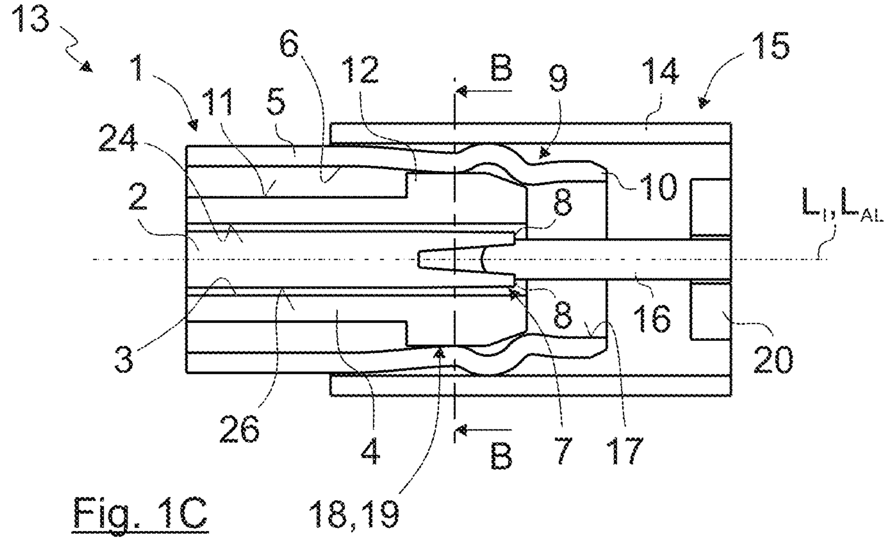
Figure 1D:
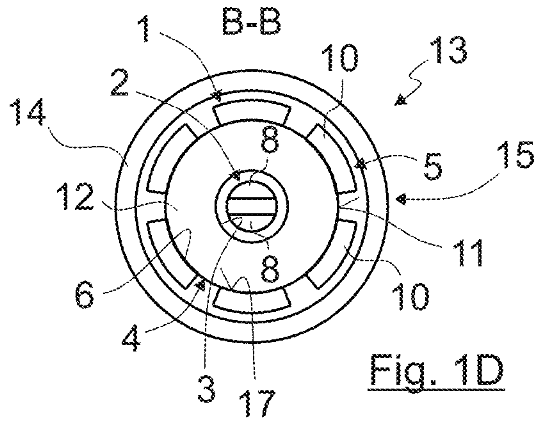
Figure 2A:
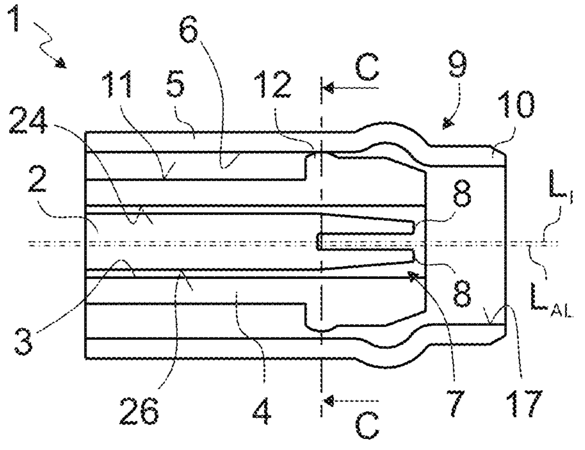
Figure 2B:
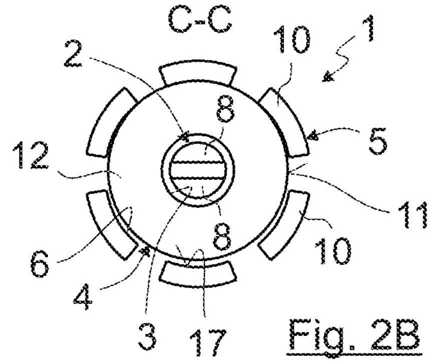
Figure 2C:
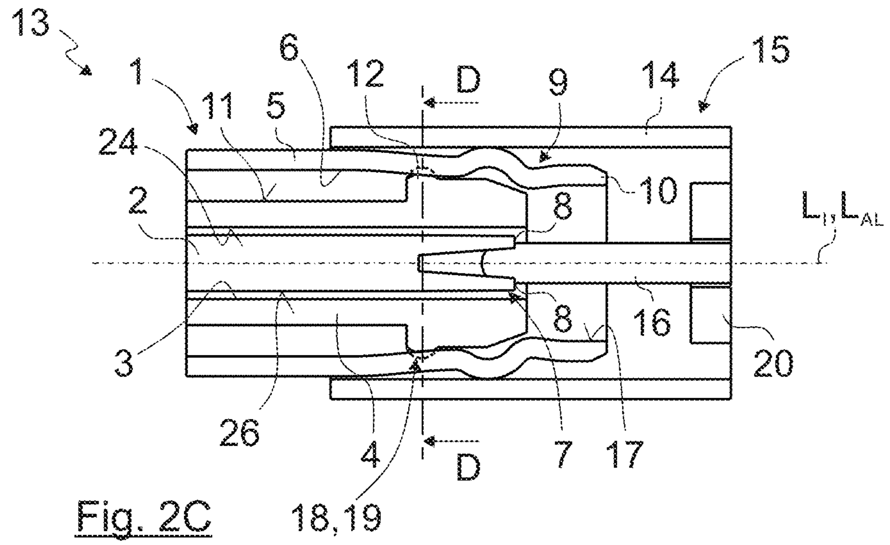
Figure 2D:
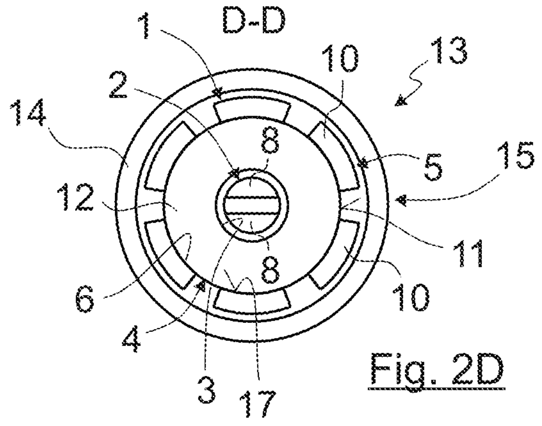
Figure 3A:
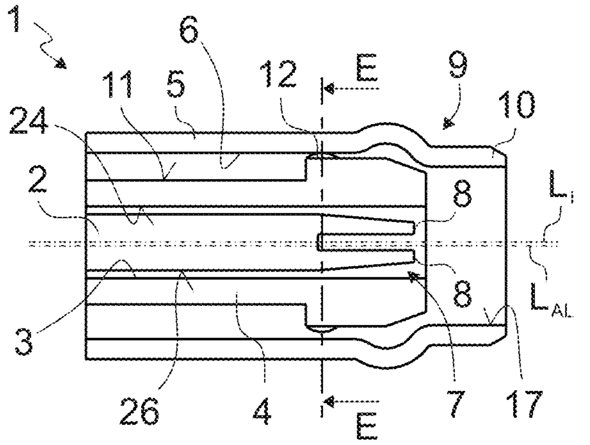
Figure 3B:
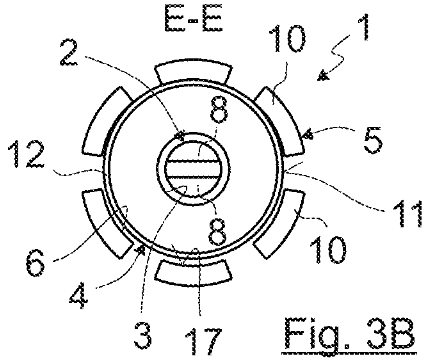
Figure 3C:
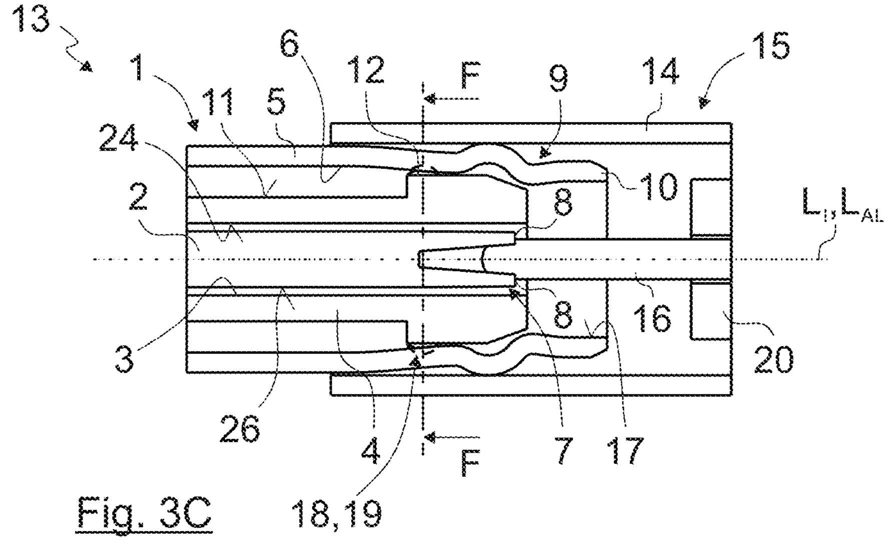
Figure 3D:
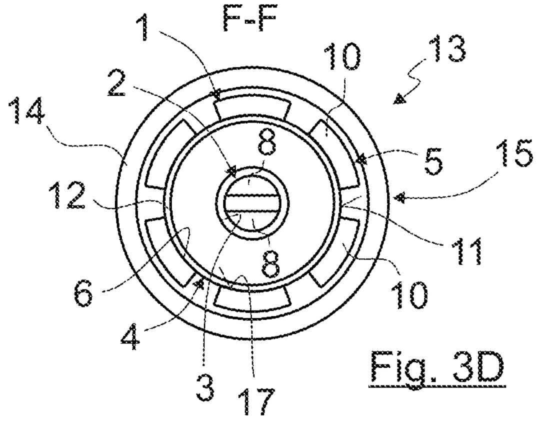
Figure 4A:
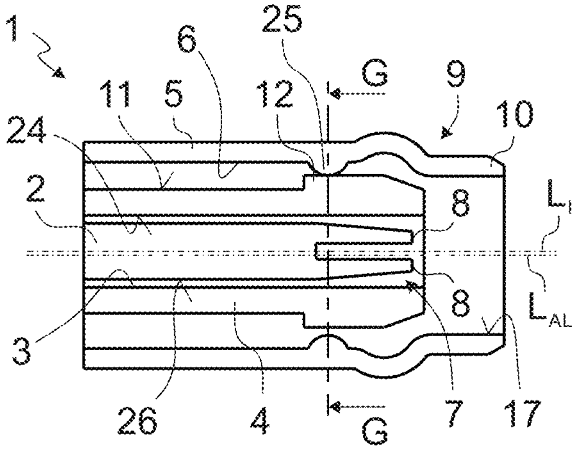
Figure 4B:
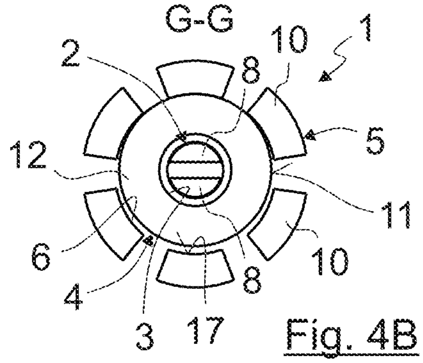
Figure 4C:
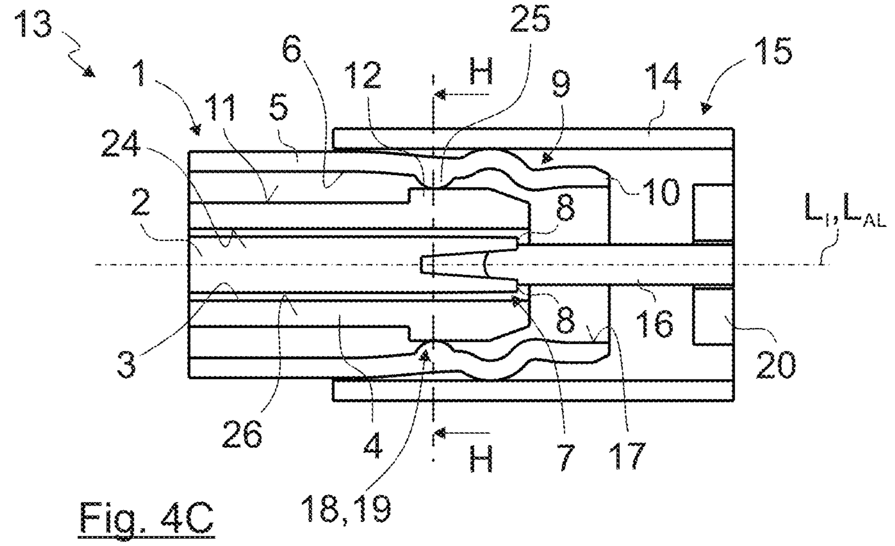
Figure 4D:
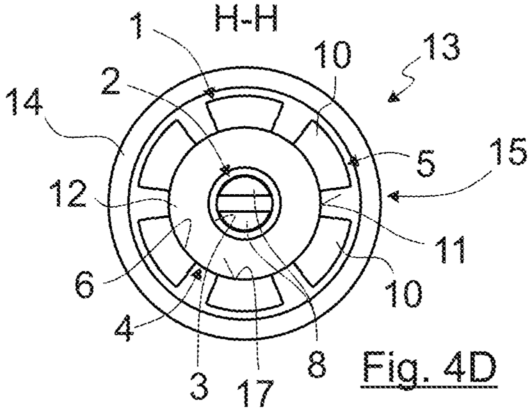
Figure 5A:
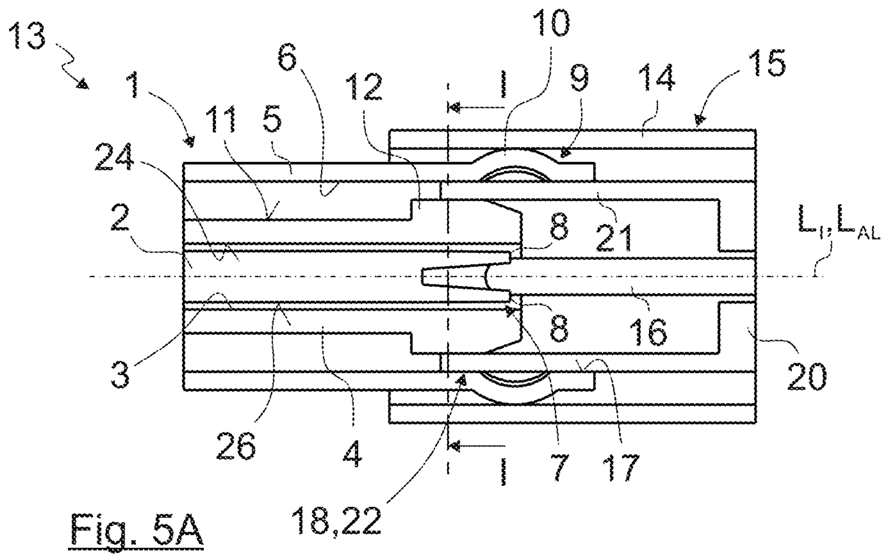
Figure 5B:
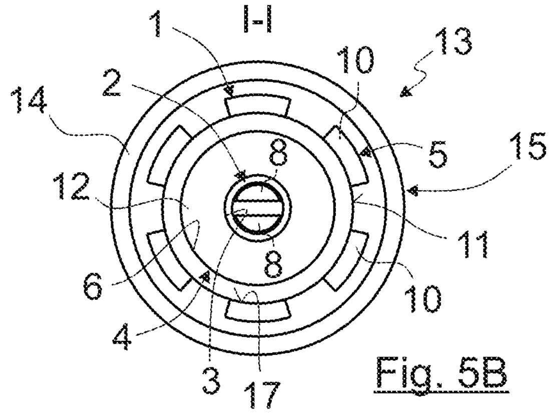

The present invention will be elucidated in more detail below with reference to the embodiment examples specified in the schematic figures of the drawing. Shown in the drawing are:

FIGS. 1A, 1B a longitudinal and cross-sectional representation of a first manifestation of an electrical plug connector in the non-plugged state, FIGS. 1C, 1D a longitudinal and cross-sectional representation of the first manifestation of the electrical plug connector in the plugged state, FIGS. 2A, 2B a longitudinal and cross-sectional representation of a second manifestation of an electrical plug connector in the non-plugged state, FIGS. 2C, 2D a longitudinal and cross-sectional representation of the second manifestation of the electrical plug connector in the plugged state, FIGS. 3A, 3B a longitudinal and cross-sectional representation of a third manifestation of an electrical plug connector in the non-plugged state, FIGS. 3C, 3D a longitudinal and cross-sectional representation of the third manifestation of the electrical plug connector in the plugged state, FIGS. 4A, 4B a longitudinal and cross-sectional representation of a fourth manifestation of an electrical plug connector in the non-plugged state, FIGS. 4C, 4D a longitudinal and cross-sectional representation of the fourth manifestation of the electrical plug connector in the plugged state, FIGS. 5A, 5B a longitudinal and cross-sectional representation of a fifth manifestation of an electrical plug connector in the plugged state.

The accompanying figures of the drawing are intended to impart further understanding of the embodiments of the invention; they illustrate embodiments and serve, in conjunction with the description, for elucidation of principles and concepts of the invention. Other embodiments and many of the stated advantages arise with reference to the drawings. The elements of the drawings have not necessarily been shown true to scale relative to one another.

In the figures of the drawing, identical, functionally identical and identically-acting elements, features and components have—unless otherwise stated—each been provided in each instance with the same reference symbols.

The figures will be described coherently and comprehensively in the following.

DESCRIPTION OF EMBODIMENT EXAMPLES

The electrical plug connector 1 exhibits an inner-conductor contact element 2, which is arranged in a through-bore 3 of an insulator element 4, and an outer-conductor contact element 5, in the central recess 6 of which the insulator element 4 is arranged.

At the distal end 7 of the inner-conductor contact element 2—that is to say, at an end of the inner-conductor contact element 2 pointing toward the mating plug connector 15—several spring lugs 8, preferentially two spring lugs 8, have been formed for electrical and mechanical contacting of a preferentially pin-shaped inner-conductor contact element 16 of the mating plug connector 15.

In the distal end region 9 of the outer-conductor contact element 5—that is to say, at an end of the outer-conductor contact element 5 pointing toward the mating plug connector 15—likewise several spring lugs 10 have been formed for electrical contacting of a preferentially socket-shaped outer conductor 14 of the mating plug connector 15. The individual spring lugs 10 of the outer-conductor contact element 5 have preferentially been arranged in equidistant angular sections on the periphery of the outer-conductor contact element 5. The spring lugs 10 may each have been fastened to the outer-conductor contact element 5 on one side by one end, or fastened to the outer-conductor contact element 5 on two sides by two ends in each instance.

A lateral extension 12 has been formed on the external generated surface 11 of the sleeve-shaped insulator element 4. The lateral extension 12 of the insulator element 4 has preferentially been formed in an axial longitudinal section of the insulator element 4 that preferentially corresponds to the axial longitudinal section in which the spring lugs 10 on the outer-conductor contact element 5 have also been formed. The insulator element 4 consequently has a larger lateral dimension in the region of the lateral extension 12 than in the remaining axial sections of the insulator element 5.

In the first manifestation of the electrical plug connector 1 according to FIGS. 1A, 1B, 1C and 1D, the lateral extension 12 of the insulator element 4 has been shaped in the form of a cylinder. The cylindrical lateral extension 12 of the insulator element 4 may extend along an axial portion of the spring lugs 10 of the outer-conductor contact element 5 or, as represented in FIG. 1A, along the entire axial longitudinal extent of the spring lugs 10 of the outer-conductor contact element 5 or even beyond the entire axial longitudinal extent of the spring lugs 10 of the outer-conductor contact element 5.

As can be clearly and unambiguously discerned from FIGS. 1A and 1B, the longitudinal axis $L_I$ of the insulator element 5 has been arranged in axially offset manner relative to the longitudinal axis $L_{AL}$ of the outer-conductor contact element 5 in the non-plugged state of the plug connector 1, and consequently the insulator element 5 has not been arranged centrically relative to the outer-conductor contact element 5. In particular from the cross-sectional representation shown in FIG. 1B, it can be discerned that in this eccentric position only a subset of the spring lugs 10 of the outer-conductor contact element 5 is in contact with the external generated surface 11 of the insulator element 4, whereas the other subset of the spring lugs 10 of the outer-conductor contact element 5 has been arranged spaced from the external generated surface 11 of the insulator element 4.

In the plugged state of the plug connection 13 according to FIGS. 1C and 1D, the sleeve-shaped outer conductor 14 of the mating plug connector 15 contacts all the spring lugs 10 of the outer-conductor contact element 5 of the plug connector 1 on the inside, and the spring lugs 8 of the inner-conductor contact element 2 of the plug connector 1 contact the pin-shaped inner-conductor contact element 16 of the mating plug connector 15 on the inside, electrically in each instance. The spring lugs 10 of the outer-conductor contact element 5 pertaining to the plug connector 1 are bent laterally inward during the plug-in procedure by the sleeve-shaped outer conductor 14 of the mating plug connector 15 in such a manner that the mechanical contact region 18, formed in each instance on the internal surface 17 of each spring lug 10, contacts an associated mechanical contact region 19 on the lateral extension 12 of the insulator element 4.

In this way, the insulator element 4 is moved out of its originally eccentric position relative to the outer-conductor contact element 5 in the non-plugged state of the plug connector 1 into a centric position relative to the outer-conductor contact element 5 in the plugged state of the plug connector 1. As is evident from FIGS. 1C and 1D, in the plugged state of the plug connector 1 the longitudinal axis $L_I$ of the insulator element 4 and the longitudinal axis $L_{AL}$ of the outer-conductor contact element 5 come to coincide. The insulator element 4 is clamped into the centric position relative to the outer-conductor contact element 5 by the spring lugs 10 of the outer-conductor contact element 5. The outside diameter of the lateral extension 12 of the insulator element 4—in particular, the mechanical contact region 19 on the lateral extension 12 of the insulator element 4—has been designed in such a way in combination with the inside diameters of the associated mechanical contact regions 18 on the internal surfaces 17 of all the spring lugs 10 of the outer-conductor contact element 5 that, in the plugged state, the contact region 18 on the internal surface 17 of each spring lug 10 contacts in each instance the associated mechanical contact region 19 on the lateral extension 12 of the insulator element 4.

In a second manifestation of a plug connector 1 according to FIGS. 2A, 2B, 2C and 2D, the lateral extension 12 on the external generated surface 11 of the insulator element 4 in the axial region of the spring lugs 10 of the outer-conductor contact element 5 is bead-shaped or ring-shaped. The bead-shaped or ring-shaped lateral extension 12 on the external generated surface 11 of the insulator element 4 preferentially has a smaller axial dimension than a cylindrical lateral extension 12. The contacting between the mechanical contact region 18 on the bead-shaped or ring-shaped lateral extension 12 of the insulator element 4 and the associated mechanical contact region 19 on the internal surface 17 of the spring lugs 10 of the outer-conductor contact element 5 is consequently reduced, preferentially to a linear or punctiform contacting. The contact pressure and therefore the press-in pressure between the spring lugs 10 of the outer-conductor contact element 5 and the insulator element 4 consequently increases. Given the same insertion force, a more efficient centering of the insulator element 4 by the spring lugs 10 of the outer-conductor contact element 5 is possible, particularly in the case of an insulator element 4 that is difficult to move or difficult to tilt.

With increased contact pressure or press-in pressure, a lateral compression of the bead-shaped or ring-shaped lateral extension 12 on the external generated surface 11 of the insulator element 4 is consequently preferentially possible, as represented in FIGS. 2C and 2D. For the purpose of illustrating the lateral compression, the dashed contour of a laterally non-compressed bead-shaped or ring-shaped lateral extension 12 on the external generated surface 11 of the insulator element 4 is represented in FIG. 2C.

Whereas in the second manifestation of the plug connector 1 according to FIGS. 2A, 2B, 2C and 2D the lateral extension 12 of the insulator element 4 has been formed in one piece with the remaining insulator element 4, in the third manifestation of a plug connector 1 according to FIGS. 3A, 3B, 3C and 3D the lateral extension 12 takes the form of a separate component which has been guided over the external generated surface 11 of the insulator element 4 and connected to the insulator element 4, preferentially by force closure via a press fit or by material closure via, for instance, an adhesive bond. The lateral extension 12 of the insulator element 4, which takes the form of a separate component, has preferentially been produced from a dielectric material and consequently constitutes an integral part of the dielectric of the coaxial plug connector 1. Alternatively, the separate component may also have been produced from a metallic material and may consequently constitute an integral part of the outer-conductor contact element 5.

In a fourth manifestation of the plug connector 1 according to FIGS. 4A, 4B, 4C and 4D, a lateral extension 25 which is directed laterally inward has been formed in each instance on the internal surface 11 of each spring lug 10 of the outer-conductor contact element 5. The lateral extension 25 on each spring lug 10 has preferentially been shaped in the form of a bead. The lateral extension 25 on the internal surface 11 of each spring lug 10 has been designed in each instance in such a way that in the plugged state of the plug connection 13 the mechanical contact region 18, formed in each instance on the lateral extension 25 of each spring lug 10, contacts an associated mechanical contact region 19 on the external generated surface 11 of the insulator element 4. Since the lateral extension 25 on each spring lug 10 represents in each instance a capacitive point of perturbation in the impedance curve of the coaxial plug connector 1, a corresponding inductive compensation should preferentially be formed in a different axial section of the plug connector 1.

In a fifth manifestation of a plug connector 1 according to FIGS. 5A and 5B, in the plugged state of the plug connector an insulator 20 of the mating plug connector 15—in particular, the sleeve-shaped end region 21 of the insulator 20 of the mating plug connector 15—has been inserted between the outer-conductor contact element 5 and the insulator element 4 of the plug connector 1. In this case, the insulator element 4 of the plug connector 1 and the insulator 20 of the mating plug connector 15—in particular, the sleeve-shaped end region 21 of the insulator 20 of the mating plug connector 15—have been arranged without play relative to one another—that is to say, the insulator element 4 of the plug connector 1 and the insulator 20 of the mating plug connector 15 have been guided relative to one another during the plug-in procedure.

In addition, all the spring lugs 10 of the outer-conductor contact element 5 have been bent laterally inward by the sleeve-shaped outer conductor 14 of the mating plug connector 15 in the plugged state of the plug connection 13 and have each been set up to clamp centrically the insulator 20, inserted between the outer-conductor contact element 5 and the insulator element 4 of the plug connector 1, of the mating plug connector 15. For this purpose, the mechanical contact region 18 on the internal surface of each spring lug 10 and a mechanical contact region 22 on the external generated surface of the insulator 20 of the mating plug connector 15 should be shaped in such a manner that a contacting, or a centric clamping, can occur.

Although the present invention has been described fully in the foregoing with reference to preferred embodiment examples, it is not restricted thereto but capable of being modified in diverse ways.

The invention claimed is:

1. An electrical plug connector, for electrical and mechanical connection to an electrical mating plug connector, comprising:

an insulator element; and an outer-conductor contact element which at least partly surrounds the insulator element, wherein a set of spring lugs has been formed in the outer-conductor contact element, wherein, in a non-plugged state of the plug connector with the mating plug connector, at least one spring lug of the set of spring lugs is spaced from the insulator element, and wherein the insulator element and at least a subset of spring lugs of the set of spring lugs have been set up such that in a plugged state of the plug connector with the mating plug connector, the insulator element is clamped in a centered manner by at least the subset of spring lugs, by virtue of a first element of the mating plug connector applied onto the outer-conductor contact element.

2. The electrical plug connector of claim 1, wherein the first element of the mating plug connector is a corresponding outer conductor of the mating plug connector, which is capable of being applied, at least in sections, onto the outer-conductor contact element of the plug connector, in order to subject at least the subset of spring lugs to a force directed laterally inward.

3. The electrical plug connector of claim 1, wherein, in the plugged state, a first mechanical contact region, formed on an internal surface of a spring lug of the set of spring lugs, contacts an associated second mechanical contact region, formed on an external surface of the insulator element, wherein the associated second mechanical contact region has the same radial spacing from a longitudinal axis (LI) of the insulating element, and wherein the first mechanical contact region has the same radial spacing from a longitudinal axis (LAL) of the outer-conductor contact element.

4. The electrical plug connector of claim 3, wherein the associated second mechanical contact region has been formed on a lateral extension of the insulator element that extends at least along an axial portion of a longitudinal extent of the set of spring lugs.

5. The electrical plug connector of claim 4, wherein the lateral extension of the insulator element has been designed to be rotationally symmetrical.

6. The electrical plug connector of claim 4, wherein the lateral extension of the insulator element is one of ring-shaped, cylinder-shaped, or bead-shaped.

7. The electrical plug connector of claim 3, wherein the first mechanical contact region has been formed on a lateral extension of the respective spring lug on the inside.

8. The electrical plug connector of claim 3, wherein the first mechanical contact region and the associated second mechanical contact region have been formed in the same axial position on the outer-conductor contact element and on the insulator element, respectively.

9. The electrical plug connector of claim 1, wherein, in the plugged state, a second element of the mating plug connector has been introduced between the outer-conductor contact element of the plug connector and the insulator element.

10. The electrical plug connector of claim 9, a first mechanical contact region, formed on an internal surface of a spring lug of the set of spring lugs, has been set up to contact an external surface of the second element of the mating plug connector.

11. The electrical plug connector of claim 1, wherein a lateral dimension of the insulator element corresponds to a lateral dimension of a recess in a second element of the mating plug connector.

12. An electrical plug connection comprising:

an electrical plug connector including an insulator element and an outer-conductor contact element which at least partly surrounds the insulator element; and an electrical mating plug connector, wherein a set of spring lugs has been formed in the outer-conductor contact element, wherein, in a non-plugged state of the electrical plug connector with the electrical mating plug connector, at least one spring lug of the set of spring lugs is spaced from the insulator element, and wherein the insulator element and at least a subset of spring lugs of the set of spring lugs have been set up such that, in a plugged state of the electrical plug connector with the electrical mating plug connector, the insulator element is clamped in a centered manner by at least the subset of spring lugs, by virtue of a first element of the mating plug connector applied onto the outer-conductor contact element.

* * * * *